United States Patent
Panicali

[11] 3,836,117
[45] Sept. 17, 1974

[54] VALVE CAP

[76] Inventor: Marcello Panicali, 2357 84th St., New York, N.Y. 11214

[22] Filed: Mar. 20, 1973

[21] Appl. No.: 342,997

[52] U.S. Cl. .............................................. 251/351
[51] Int. Cl. ............................................ F16k 31/50
[58] Field of Search ........... 251/351, 352, 353, 354, 251/340, 341

[56] References Cited
UNITED STATES PATENTS

| | | | |
|---|---|---|---|
| 2,508,503 | 5/1950 | Doepke | 251/346 X |
| 2,791,236 | 5/1957 | Mauer | 251/351 X |
| 3,059,821 | 10/1962 | Kubilinas | 251/351 |
| 3,181,555 | 5/1965 | Jacobson | 251/351 X |
| 3,184,091 | 5/1965 | Hoffman | 251/351 X |
| 3,213,884 | 10/1965 | Moyer et al | 251/343 X |
| 3,367,626 | 2/1968 | Stern | 251/340 |
| 3,528,641 | 9/1970 | Harris, Sr. et al | 251/340 |
| 3,578,285 | 5/1971 | Carlton | 251/351 X |
| 3,601,358 | 8/1971 | Cruse | 251/351 X |

*Primary Examiner*—Henry T. Klinksiek
*Attorney, Agent, or Firm*—Sydney B. Schlessel

[57] ABSTRACT

Valve attachment for a water pipe constituting a hollow, open-ended body member having an enlarged threaded bore in one end communicating with a reduced threaded bore in its other end, in combination with a knurled nut having a hollow, open-ended stem extending axially therefrom and provided with a drain opening in the stem wall leading into the rear of the stem hollow. The stem is reciprocatively threaded through the reduced body member bore, whereby rotation of the stem in one direction closes the valve, and rotation in the opposite direction exposes the drain opening to effect discharge of water from the water pipe. Washers provide a fluid seal.

7 Claims, 3 Drawing Figures

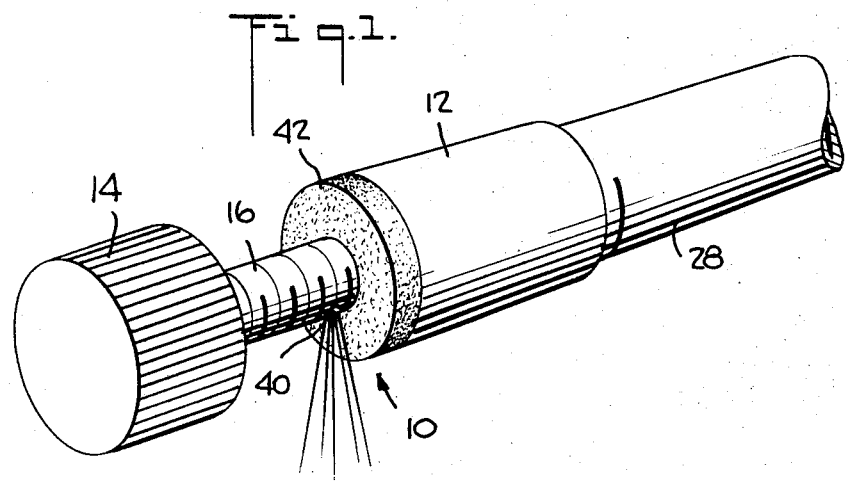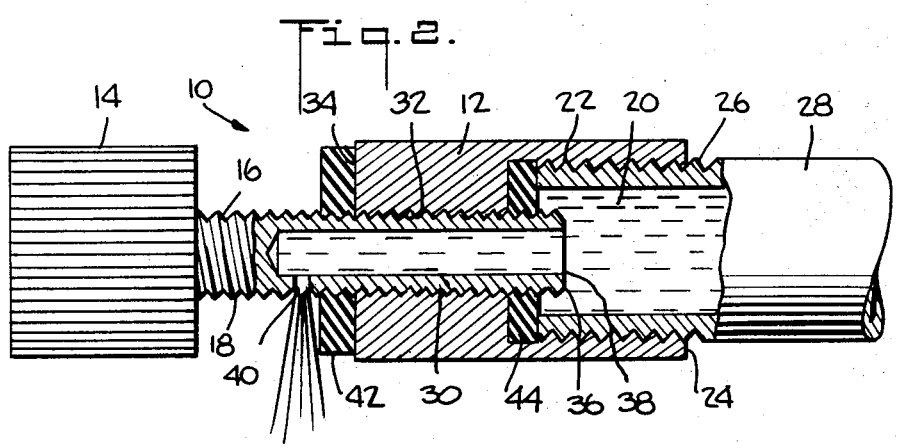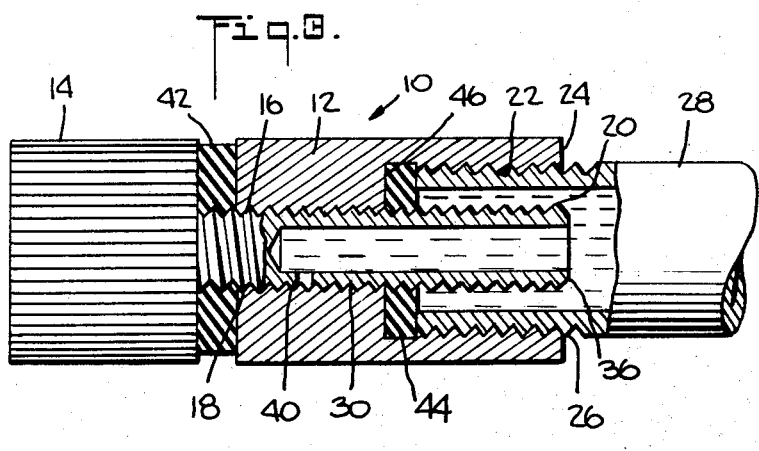

VALVE CAP

BACKGROUND OF THE INVENTION

1. Field of the Invention

This invention relates to the field of plumbing, particularly in new building construction and in alterations of existing plumbing installations, and has for its objective the provision of a valve cap adapted for temporary connection to the free end, or nipple, of a newly installed water pipe prior to the attachment of the permanent plumbing fixture, for the purpose of testing the pipe for leaks and to close off the pipe prior to fixture installation, whereby the drainage of water from the pipe during testing is controlled and selectively directed.

2. Prior Art

In the present state of the art, when a new water pipe is installed a closure cap is fitted to the free end, or nipple, of the pipe. The pipe is then tested for leaks by turning the water line on and partially unscrewing the cap to allow for escape of air from the pipe and thereafter the water coming from the main line. When water starts to squirt out of the pipe it does so in all directions until the cap is retightened. Since the direction of water flow is uncontrolled and undirected, considerable water damage may occur before the cap can be retightened.

BRIEF SUMMARY OF THE INVENTION

The aforementioned disadvantages are obviated by my invention, which provides a valve cap, adapted for attachment to the free end, or nipple, of the water pipe, and comprising a body member and a rotatable head or nut having a hollow stem axially secured therethrough and threadedly mounted through the body member, with the stem provided with a drain opening through its circular wall in communication with the hollow or channel of the stem, so that, when the nut is partially unscrewed from the body member the drain opening will be exposed between the former and the latter to provide a passageway for air or water to pass out of the water pipe in the direction dictated by the positioning of the drain opening. Washers are disposed between the body member and the nut, and within the body member, to provide an air-tight and water-tight seal when the valve cap is closed.

It is therefore the principal object of my invention to provide a valve cap for a water pipe whereby a partial opening of the valve cap, as above described, will permit selective discharge of air and water from the pipe.

A second important object of my invention lies in the provision of a valve cap for temporary attachment to a water pipe whereby a partial selective opening of the valve cap will provide directional discharge from the pipe.

A third important object of my invention lies in the provision of a valve cap of great durability, as a temporary fitting for a water pipe, which can be used repeatedly and successively for new water pipes as its need is no longer required for prior installations.

Another important object of my invention lies in the provision of a valve cap which will permit discharge of water from a water pipe while the valve cap remains engaged to the pipe, and without complete removal therefrom.

Still another important object of my invention lies in the provision of a valve cap for temporary engagement to a water pipe, which is simple to install and to operate.

These and other objects, advantages and functional features of my invention, together with the novel features of construction, composition and arrangement of parts, will become more readily apparent from an examination of the following specification, taken with the accompanying drawins, wherein:

BRIEF DESCRIPTION OF THE DRAWINGS.

FIG. 1 is a perspective view of a preferred embodiment of my invention, shown secured to the free end, or nipple, of a water pipe;

FIG. 2 is a side view, partly in cross-section of the embodiment of FIG. 1, showing the valve cap open and discharging water; and FIG. 3 is a view similar to FIG. 2, showing the valve cap closed.

Similar reference characters designate similar parts throughout the different views.

DETAILED DESCRIPTION OF THE INVENTION

Illustrative of the embodiment shown by the drawings my valve cap 10 comprises a hollow body member 12 and a knurled head or nut 14. The nut 14 is provided with a stem 16 axially mounted therein and extending therefrom, and provided with an external thread 18. The body member 12 is hollow and is provided with an enlarged forward bore 20, provided with an internal thread 22 extending to the open end 24 of the bore 20 and adapted to engage the external thread 26 of a water pipe 28, and a reduced rear bore 30 which is provided with an internal thread 32 adapted to be engaged by the external thread 18 of the stem 16 so as to permit the stem 16 to be threaded through the body member, through its opening 34, by the rotation of the nut 14 in one direction, and to be withdrawn therefrom by rotation of the nut 14 in the opposite direction.

The portion of the stem 16 extending from the nut 14 is hollow and open at its forward end 36, with the opening 38 communicating with the bore 20 and pipe 28, and a drain opening 40 is provided in the wall of the stem 16, opening into the hollow or channel of the stem 16 and providing a passageway therefor out of the valve cap 10 for water coming from the pipe 28 through the body member 12, the drain opening 40 being disposed near the closed end of the stem hollow or channel, as shown in FIGS. 2 and 3. A direct passageway is therefore provided for water from the pipe 28 to be discharged through the drain opening 40 when the valve cap 10 is open, as shown in FIG. 2, and this passageway is closed off when the stem 16 is completely threaded into the body member 12, as shown in FIG. 3.

A washer 42, preferably made of rubber, is provided around the stem 16 between the nut 14 and the body member 12, to provide a seal thereinbetween when the valve cap 10 is closed, and a second washer 44 is provided around the stem 16 within the body member 12, and in abutment against the shoulder 46 formed by the reduced bore 30, for the same purpose, the external diameter of the washer 42 being the same as the external diameters of the body member 12 and nut 14, and the external diameter of the washer 44 such that the free end of the pipe 28 impinges against the washer 44 when the body member 12 is attached to the pipe 28.

The entire valve cap 10 is preferably composed of cold, rolled steel, drilled and tapped as above described, with the stem 16 of stainless steel, and by reason of such construction the valve cap 10 may be used almost endlessly on new installations as its need on prior installations terminates. Other suitable metals may be employed, instead, if desired, or the entire valve cap 10 may be constructed of plastic material for cost reduction. While it is intended that the valve cap 10 be constructed to fit standard pipe sizes, such as ⅜ inch for basins and toilet bowls, ½ inch for shower controls and kitchen sinks, ¾ inch for urinals, and 1 inch for toilets with flushometers, it is well understood that my invention may be constructed to service water pipes of other sizes as well.

OPERATION OF THE INVENTION

In the operation of my invention, as soon as each water pipe is installed in the construction a valve cap 10 is attached to the free end, or nipple, of the pipe. The water line is then opened and water forced through the line. The valve cap 10 is opened by rotation of the nut 14 until the drain opening 40 is exposed between the nut 14 and the body member 12, as shown in FIG. 2, with the drain opening 40 directed downward, while a pail or other receptacle is placed below the opening 40. As the air within the pipe 28 is forced out through the drain opening 40 the water from the water line follows and is thus directed into the pail or other receptacle. The pipe 28 is then checked for leaks, and if any are found they are corrected. The nut 14 is then rotated to close the valve cap 10, as shown in FIG. 3. After testing, the valve cap 10 is thereafter removed, to be replaced by the permanent plumbing fixture, and is then available for attachment to another water pipe for the same function and operation.

It is to be noted that the embodiment shown and described is by way of illustration and not of limitation, and that various changes may be made in the construction, composition and arrangement of parts without limitation upon or departure from the spirit and scope of the invention, or sacrificing any of the advantages thereof inherent therein, all of which are herein claimed.

Having described my invention, I claim:

1. A valve for a water pipe comprising a hollow, open-ended body member provided with a threaded bore in its forward portion adapted to engage the threaded end of a water pipe, and a reduced threaded bore in communication and axially aligned therewith and extending rearwardly therefrom, in combination with a hollow stem threaded for reciprocative movement through the reduced bore of the body member, the stem being open at the end entering the body member and closed at its other end, at least one drain opening in the stem wall leading into the stem hollow adjacent its closed end, and means at the closed end of the stem to rotate the stem in one direction to introduce the drain opening into the body member to close the valve and to rotate the stem in the opposite direction to expose the drain opening from the body member to thereby open the valve and effect drainage of water from the water pipe.

2. A valve as described in claim 1, the means to rotate the stem comprising an enlarged head integral with the closed end of the stem outside of the body member.

3. A valve as described in claim 2, the enlarged head being knurled.

4. A valve as described in claim 2, whereby selective rotation of the stem to expose the drain opening from the body member controls the direction of the water flow.

5. A valve as described in claim 4, with means to effect a fluid seal for the valve in closed position.

6. A valve as described in claim 5, the means to effect a fluid seal comprising a washer disposed around the stem between the enlarged head and the body member, and a second washer disposed around the stem within the body member in abutment against the shoulder formed therein between the forward and reduced bores thereof.

7. A valve as described in claim 6, the enlarged head having the same outer diameter as the body member.

* * * * *